United States Patent
Ødegaard

(10) Patent No.: US 6,578,603 B1
(45) Date of Patent: Jun. 17, 2003

(54) SWIVEL APPARATUS

(75) Inventor: Jens Ødegaard, Nordstrøno (NO)

(73) Assignee: Framo Engineering AS, Bergen (NO)

( * ) Notice: Subject to any disclaimer, the term of this patent is extended or adjusted under 35 U.S.C. 154(b) by 0 days.

(21) Appl. No.: 10/018,525

(22) PCT Filed: Jun. 22, 2000

(86) PCT No.: PCT/NO00/00216

§ 371 (c)(1),
(2), (4) Date: May 30, 2002

(87) PCT Pub. No.: WO00/79174

PCT Pub. Date: Dec. 28, 2000

(30) Foreign Application Priority Data

Jun. 23, 1999 (NO) ............................................. 993131

(51) Int. Cl.[7] .............................................. F16L 39/04
(52) U.S. Cl. ...................................... 137/580; 285/190
(58) Field of Search .......................... 137/580; 285/190

(56) References Cited

U.S. PATENT DOCUMENTS

| | | | | |
|---|---|---|---|---|
| 2,933,321 A | * | 4/1960 | Cascone | 285/190 |
| 3,923,133 A | * | 12/1975 | Chivari | 192/85 R |
| 4,405,162 A | * | 9/1983 | Williams | 285/95 |
| 4,683,912 A | * | 8/1987 | Dubrosky | 137/580 |
| 5,702,130 A | | 12/1997 | Jostein | |
| 5,718,458 A | | 2/1998 | Erstad | |
| 5,760,292 A | | 6/1998 | Jostein | |
| 5,797,413 A | * | 8/1998 | Pollack | 137/1 |

* cited by examiner

Primary Examiner—A. Michael Chambers
(74) Attorney, Agent, or Firm—Millen, White, Zelano & Branigan, P.C.

(57) ABSTRACT

A swivel apparatus for the transfer of at least one pressurized process fluid, comprising a central stem (2) on which there are placed a number of ring elements (3–6) comprising at least one outlet ring (3) having a number of outlets (10) communicating through an annulus (14) with an associated course (12 resp. 13) in the stem (2), and a number of supporting rings (5, 6) which are stationarily arranged on the stem (2). Between the stem (2) and the outlet ring (3) there is arranged a distance ring (4) which is stationary relative to the stem, and on each side of the outlet ring there is arranged a supporting ring (5 resp. 6) which is stationary relative to the stem and which is axially supported both by the distance ring (4) and an axial bearing (17) arranged at a radial distance therefrom between the supporting ring (5 resp. 6) and the outlet ring (3). A dynamic sealing means (21) between the outlet ring (3) and each supporting ring (5 resp. 6) is arranged in the radial region between the distance ring (4) and the axial bearing (17) in question.

10 Claims, 4 Drawing Sheets

SWIVEL APPARATUS

The invention relates to a swivel apparatus for the transfer of at least one pressurized process fluid, comprising a central stem on which there are placed a number of ring elements comprising at least one outlet ring having a number of outlets communicating through an annulus with an associated course in the stem, and a number of supporting rings of which at least one is stationarily arranged on the stem, dynamic sealing means for sealing against the annulus being arranged between mutually movable ring elements, and bearing means for mutual support for the ring elements.

A swivel apparatus of the above mentioned type is shown and described in the non-prepublished Norwegian patent application No. 981379. This swivel apparatus comprises a number of annulus elements of which each consists of a so-called intermediate ring and an outer outlet ring defining between them an annulus for fluid transfer. The intermediate ring is stationarily arranged on the stem, and on each side thereof there is arranged a bearing ring which is provided with a bearing for support in relation to the intermediate ring. Further, between the intermediate ring and each bearing ring there are arranged axial, dynamic seals which are integrated in the bearing rings. Between the stem and the intermediate ring there are arranged radial static seals, and radial static seals are also arranged between each of the bearing rings and the outlet ring, for sealing against fluid from the annulus. The latter static seals are located at a relatively large distance from the stem, because of the fact that the intermediate ring must have a radial extension which is sufficient for accommodating both the bearing means and said dynamic seals. The bearing rings in which the dynamic seals are integrated, here are fixed or supported at only one place, and deformations in the sealing zones in some fault situations will be a limiting factor.

As regards the radial static seals, it has turned out that deformations and expansions, because of temperature gradients and because of internal pressures in the area around the seals, is a substantial factor putting operational limitations on the swivel.

It is a general object of the invention to provide a swivel structure making it possible to extend the operational limits for the swivel with respect to rate of flow, pressure and temperature, and which also implies a simpler construction and assembling, and therewith reduced manufacturing costs.

Another object of the invention is to provide a swivel structure wherein some of the previously used, critical seals are removed, and wherein the ring elements in the region in which the dynamic seals operate, are better fixed or supported, something which implies that the seals operate under more optimal conditions.

A further object is to provide a swivel structure which is suitable for building of multi-course swivels having quite independent courses, and which also enables that the production through some courses in such a swivel can be maintained during replacement or service of the other swivel courses.

For achieving the above-mentioned objects there is provided a swivel apparatus of the introductorily stated type which, according to the invention, is characterized in that, between the stem and the outlet ring, there is arranged a distance ring which is stationary relative to the stem, and that, on each side of the outlet ring, there is arranged a supporting ring which is stationary relative to the stem and which is axially supported both by the distance ring and an axial bearing arranged at a radial distance therefrom between the supporting ring and the outlet ring, a dynamic sealing means between the outlet ring and each adjacent supporting ring being arranged in the region between the distance ring and the axial bearing in question.

In an advantageous embodiment of the swivel apparatus, the distance ring comprises a plurality of radial holes communicating with an annulus-forming peripheral groove in the stem, and with a ring groove in the adjacent end surface of the outlet ring. Further, the outlet ring at its outer end preferably is provided with a pair of axially oppositely directed ring flanges bordering respective ones of the supporting rings, a radial bearing being arranged between an inner surface of each ring flange and an adjacent surface portion of the supporting ring in question.

As will be seen, the ring elements around the dynamic seals in the present structure are supported at two places, viz. both in the distance rings and the axial bearings, and this will imply substantially smaller deformations, something which is one of the most important presuppositions for securing an operationally safe sealing and swivel system.

In the swivel apparatus according to the invention, the individual ring elements have been changed with respect to design and function, as compared to the known swivel structure described above. The stated sealing arrangement with axial and radial bearings sees to it that the relative movements and frictional conditions are controlled. Because of the configuration of the outlet rings, in addition to the fact that there are no statical radial seals in connection therewith, the outlet rings can be dimensioned for large rates of flow in combination with high pressures and a high temperature gradient.

As a result of the fact that only the outlet rings are rotatable in relation to the centre stem, whereas the remaining ring elements are stationarily arranged on the stem, the fluid courses in the present swivel structure will be independent of each other. Thus, one may operate with independent courses in the swivel, something which implies that one can make use of only the number of courses for which there is a need at any time. The unused courses or spare courses may be pressure relieved and without rotation during operation of the remaining courses, so that one avoids unnecessary wear of parts having a limited working life. This is a substantial advantage in relation to the prior art.

The invention will be further described below in connection with exemplary embodiments with reference to the drawings, wherein FIG. 1 shows an axial sectional view of a swivel apparatus according to the invention;

Figure 1:
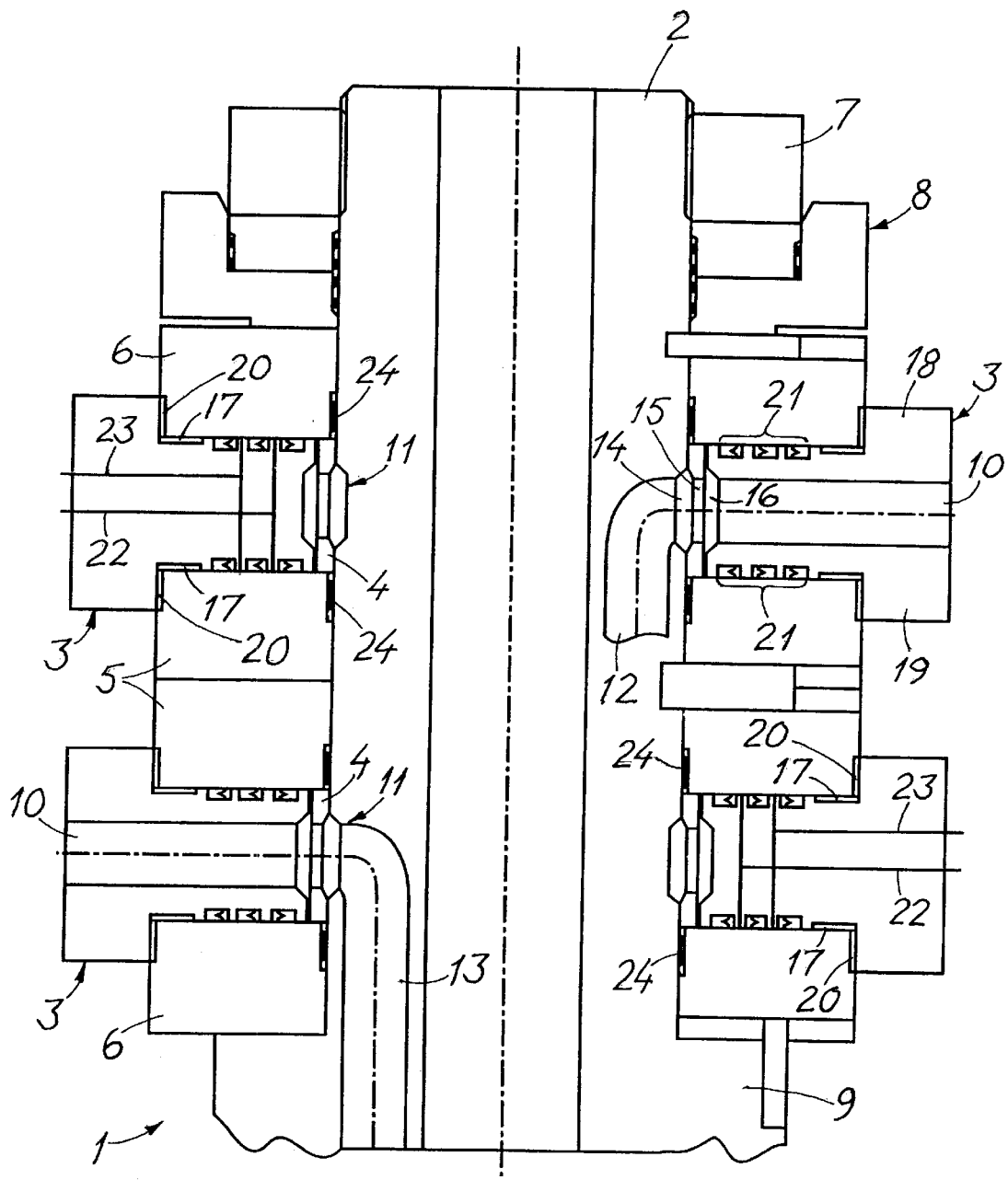

The swivel apparatus 1 shown in FIG. 1 comprises a central core or stem 2 on which there are placed a number of ring elements, in the illustrated case more specifically two outlet rings 3, two distance rings 4 of which each is located between the stem and an associated outlet ring, and four supporting rings arranged on respective sides of the outlet rings 3, more specifically two intermediate rings 5 and two end rings 6 which are approximately identical. Further, at the top of the centre stem 2, there is placed a locking nut 7 and a compensating unit 8 arranged under the nut to keep the ring elements preloaded against a lower holding flange 9 on the centre stem 2. The compensating unit sees to it that the preload on the ring elements is maintained during the operation, so that the seatings and bearings of the swivel apparatus operate under conditions that are as optimal as possible. For a further description of this unit, reference is made to the aforementioned patent application.

Each of the outlet rings 3 is provided with a plurality of radial borings or outlets 10 (only one is shown) which, through an annulus means 11, communicates with an associated course 12 and 13, respectively, in the stem, so that a connection is formed for the transfer of pressurized process fluid (liquid or gas) from the stem 2 to a pipe arrangement (not shown) which in practice will be mounted on the outlet rings. As appears, the annulus means 11 consists of a peripheral ring groove 14 arranged in the centre stem and which, through a plurality of radial holes 15 (only one is shown) in the distance ring 4 communicates with a ring groove 16 in the adjacent end surface of the outlet ring 3.

Both the distance rings 4 and the supporting rings 5, 6 are stationarily arranged on the centre stem 2, whereas the outlet rings 3 are movable in relation to the first-mentioned rings. When such a swivel apparatus is used on board a floating vessel, the outlet rings will be stationary in relation to the ship and move in relation to the remaining rings and the centre stem. As mentioned in the introduction, the fluid courses in the swivel are independent of each other, so that one possibly may use only some of the courses, whereas the remaining courses are pressure-relieved spare courses which therewith are out of operation and are not subjected to wear.

As appears, the distance rings 4 are radially short rings serving for support of the inner ends of the respective supporting rings 5, 6. In addition to this support, each of the supporting rings are also supported by means of an axial bearing 17 arranged at a radial distance from the distance ring 4 between the supporting ring in question and the adjacent outlet ring 3. As shown, each outlet ring 3 at its outer end is provided with a pair of axially oppositely directed ring flanges 18 and 19, respectively, bordering respective ones of the supporting rings 5, 6, and a radial bearing 20 is arranged between an inner surface of each ring flange and an adjacent surface portion of the supporting ring 5, 6 in question. This arrangement of axial and radial bearings provides for control of the movements and the frictional conditions.

Between each outlet ring 3 and the adjacent supporting rings 5, 6 there is arranged a dynamic sealing means 21 located in the radial intermediate space between the distance ring 4 and the axial bearing 17 in question. The sealing means 21 is shown to consist of three separate elements placed in separate ring grooves in the upper and lower surfaces of the outlet ring 3. The sealing elements suitably may consist of lip seals which in a known manner are arranged to be activated either by the process fluid or by a barrier liquid, preferably oil, having a pressure which is higher than the process fluid pressure.

In FIG. 1, lines or channels 22, 23 for the supply of such a barrier liquid are suggested in the outlet rings 3. Because of the fact that the supporting rings 5, 6 are supported at two radially spaced places, as mentioned above, there is obtained that the clearances in the dynamic sealing zones may be controlled very well and kept within close tolerances. The illustrated arrangement also implies that there may be obtained a sufficient space for the assembly of the desired number of sealing elements, without large radial dimensions of the outlet and supporting rings.

The side surfaces of the supporting rings 5, 6 against which the dynamic sealing elements rest, are coated with a hard coating with a view to wear resistance.

A static radial sealing means 24 is arranged between the stem 2 and the adjacent inner surface of each of the supporting rings 5, 6. Also this sealing means suitably may consist of separate sealing elements arranged to be activated by a barrier liquid, as mentioned in connection with the dynamic seals.

The arrangement of the dynamic and the static seals will be further described below with reference to FIGS. 3 and 4.

Figure 2:
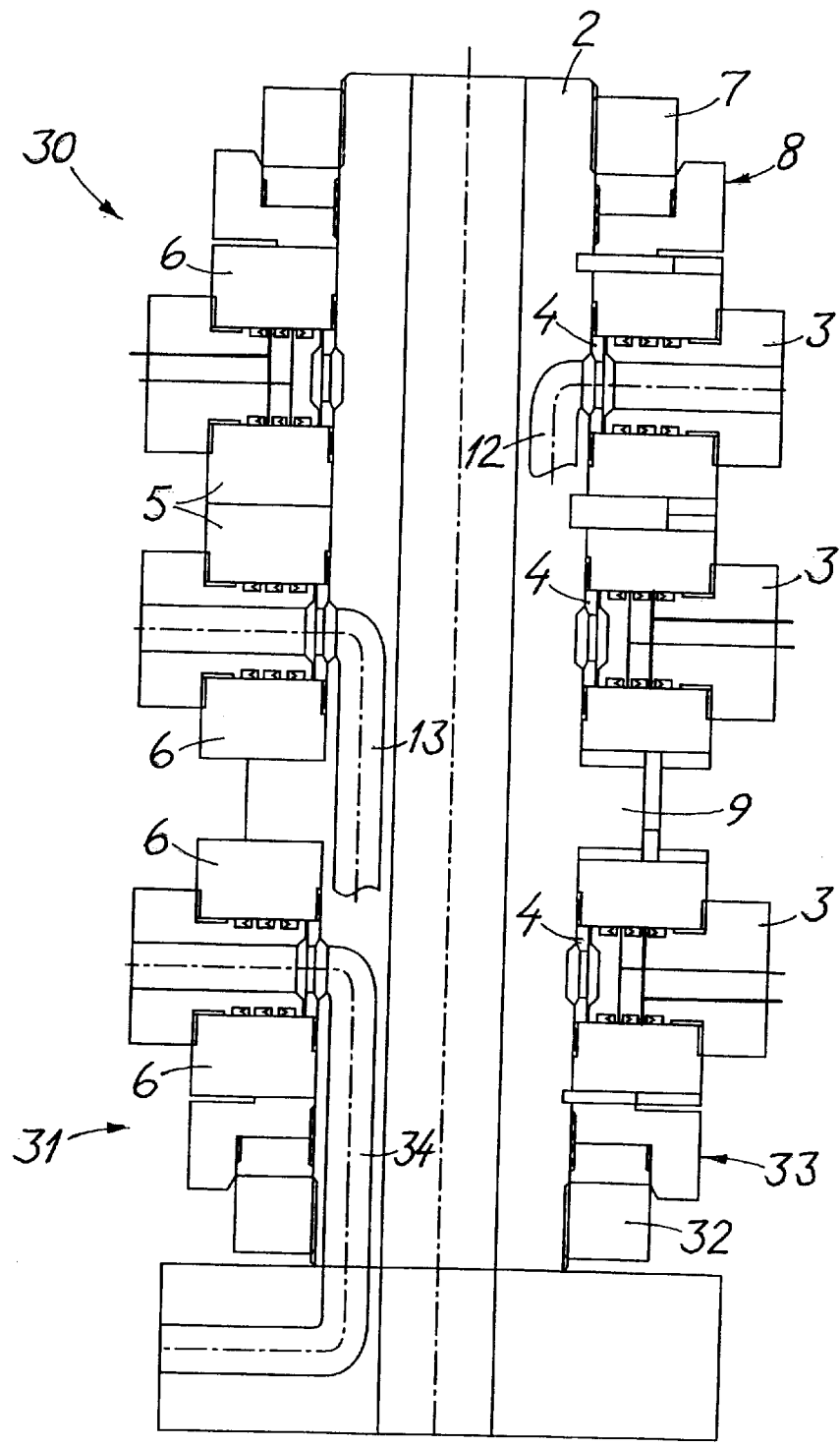
FIG. 2 shows an axial sectional view of a swivel apparatus containing a pair of mutually independent swivel assemblies.

FIG. 2 shows an embodiment of a swivel apparatus according to the invention in the form of a multi-course swivel wherein the apparatus comprises a pair of swivel assemblies 30, 31 arranged on the upper side and the under side, respectively, of the holding flange 9 arranged on the centre stem 2 and located in a central area of the stem. The upper assembly 30 corresponds to the swivel embodiment in FIG. 1 and thus comprises two outlet rings 3 with associated distance rings 4 and supporting rings 5, 6, whereas the lower assembly 31 in this embodiment comprises a single outlet ring 3 with an associated distance ring 4 and supporting rings in the form of two end rings 6. The ring elements in the upper assembly 30 are kept preloaded against the holding flange 9 by means of the locking nut 7 and the compensating unit 8, whereas the ring elements in the lower assembly 31 are kept preloaded against the holding flange 9 by means of a lower locking nut 32 and a compensating unit 33.

The upper swivel assembly thus contains two fluid courses 12, 13, whereas the lower assembly contains only one such course 34. As mentioned above, the fluid courses are independent of each other, a single course being able to be put out of operation by removing a driving arm (not shown), so that the entire outlet unit rotates as a part of the stem 2. By dividing the swivel apparatus in two independent assemblies, one may possibly carry out service on the swivel assembly 30 which is located above the holding flange or shoulder 9, whereas there is produced from the swivel assembly 31 below the shoulder.

Figure 3:
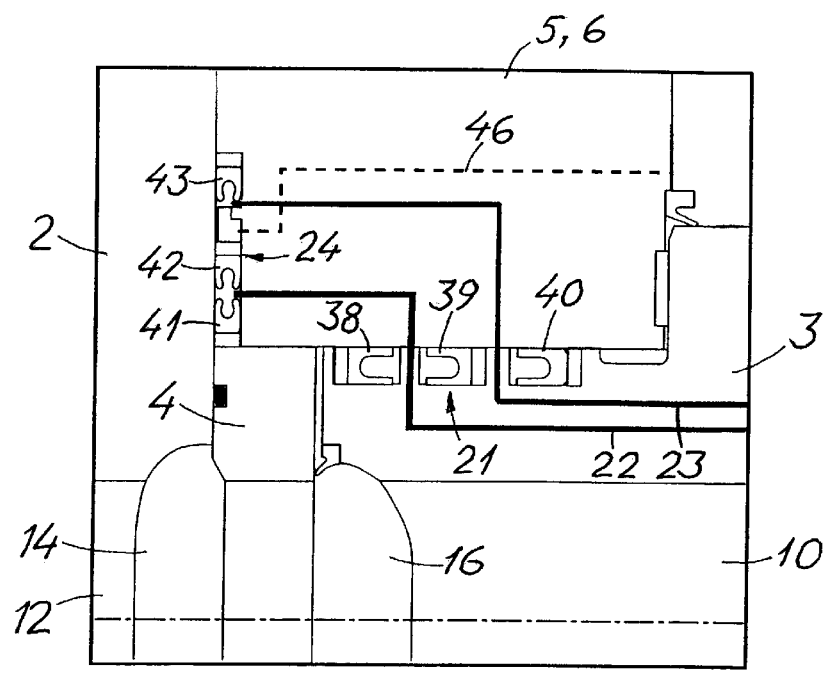
FIGS. 3 and 4 show two alternative arrangements of sealing means.
Figure 4:
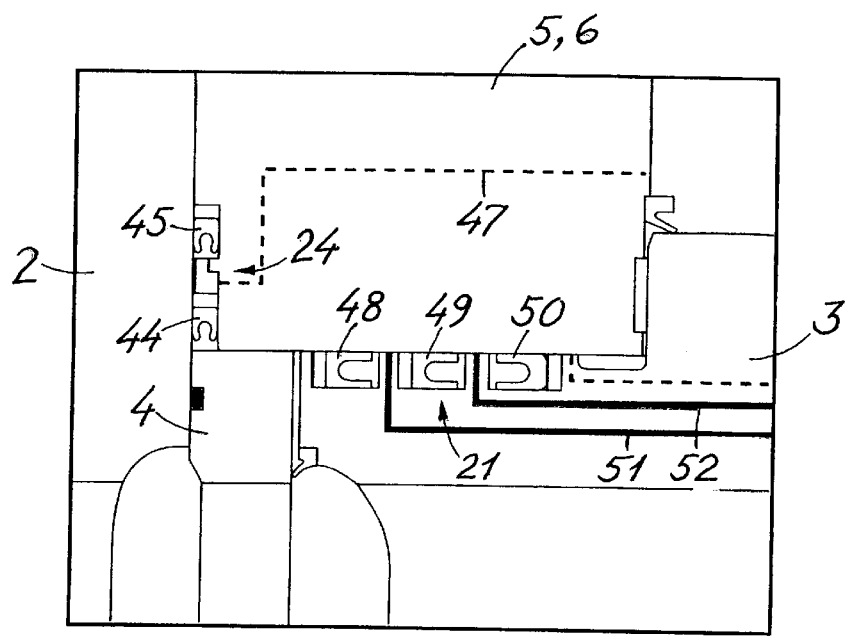

Examples of alternative sealing arrangements which may be used in the swivel apparatus according to the invention, are shown in FIGS. 3 and 4. The choice of sealing arrangement will be made on the background of relevant field and operational a conditions, and in some cases on the background of requirements or wishes from the operator.

In the arrangement shown in FIG. 3 the dynamic sealing means 21 comprises three separate sealing elements, or specifically a primary seal 38, a secondary seal 39 and an additional secondary seal or environment seal 40. Also the static sealing means 24 comprises three sealing elements, more specifically a primary seal 41, a secondary seal 42 and an additional secondary seal or environment seal 43. As suggested, both the dynamic and the static seals are barrier liquid activated, a barrier liquid (oil) being supplied through the channels 22 and 23. Two pressure levels are here used on the barrier liquid, the channel 22 being a part of a high pressure system and the channel 23 being a part of a low pressure system.

Both in the dynamic and in the static sealing means, the primary and the secondary seal 38 and 39 respectively 41 and 42 closest to the process course 12 are mounted against each other and are activated by the high pressure system. The additional secondary seal or environment seal 40 and 43, respectively, is activated by the low pressure system. As an alternative, the low pressure barrier channel 23, if one chooses not to use barrier liquid activated seals, may be a pressure-relieved channel which is used for detection of leakage from the other seals. If the primary dynamic seal 38 fails, the secondary seal 39 will be process activated. If the secondary seal 39 fails, the secondary/environment seal 40 will take over the function of the seal which has failed.

As regards the static sealing means, the barrier liquid system provides for activating the seals initially, which implies that the seals operate under approximately static conditions. The illustrated arrangement with three separate sealing elements may be used independently of how the dynamic seals are arranged.

FIG. 4 shows a sealing arrangement wherein the static sealing means 24 is process activated whereas the dynamic sealing means 21 is barrier liquid activated.

The static sealing means 24 comprises a primary seal 44 and a secondary seal 45 arranged in series between the stem 2 and a supporting ring 5 or 6, and is activated by the process liquid pressure. In addition there is provided a possibility for detecting a leakage across the primary seal, or alternatively to carry out a seal repair through a bore in the supporting ring 5 and 6, respectively, as suggested with the stippled line 47. A corresponding stippled line 46 for the same purpose is shown in FIG. 3.

The dynamic sealing means 21 comprises a primary seal 48, a secondary seal 49 and an additional secondary seal or environment seal 50. Also in this embodiment there are used two pressure levels on the barrier liquid, but the primary seal here is activated by a barrier liquid having a lower pressure than the barrier liquid for activating the secondary seals. Thus, the primary seal is activated by a barrier oil pressure in a channel 51 which is set above the maximum process pressure, whereas the two secondary seals are mounted against each other and are activated by a barrier oil pressure in a channel 52 lying about 10 bar above the barrier oil pressure in the channel 51.

As will be clear, many other alternative sealing arrangements may be used. For example, all the seals may be process activated, so that there is no need for a barrier liquid system with an associated control panel. In the dynamic sealing means, the primary seal then for example may be changed to a scraper ring, and in addition a pair of dynamic seals (primary and secondary) may be arranged in series after the scraper ring. Further, the individual seals may be equipped with detection channels for condition control, and these channels alternatively may be used as injection points for seal repair.

Figure 5:
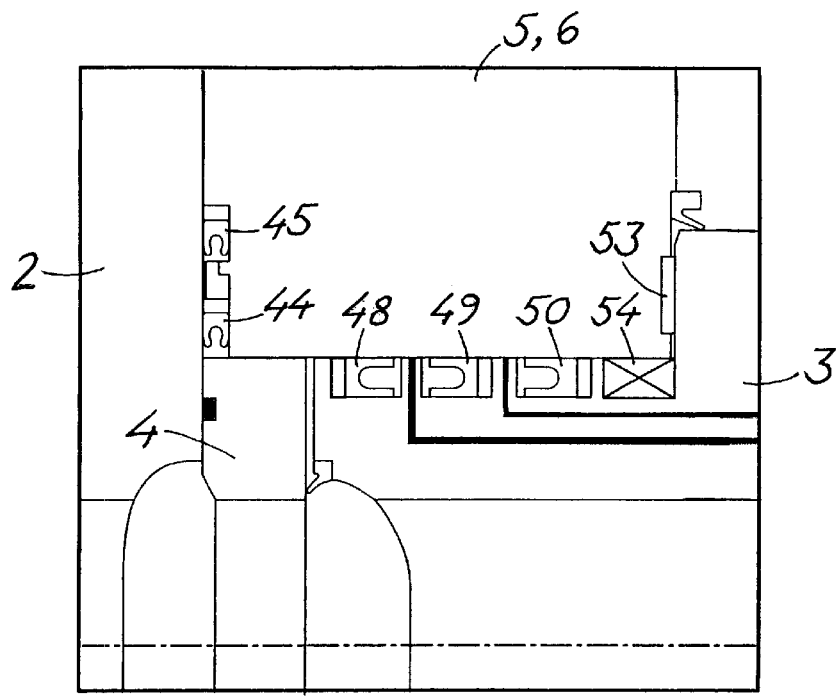
FIGS. 5 and 6 show two alternative arrangements of bearing means.
Figure 6:
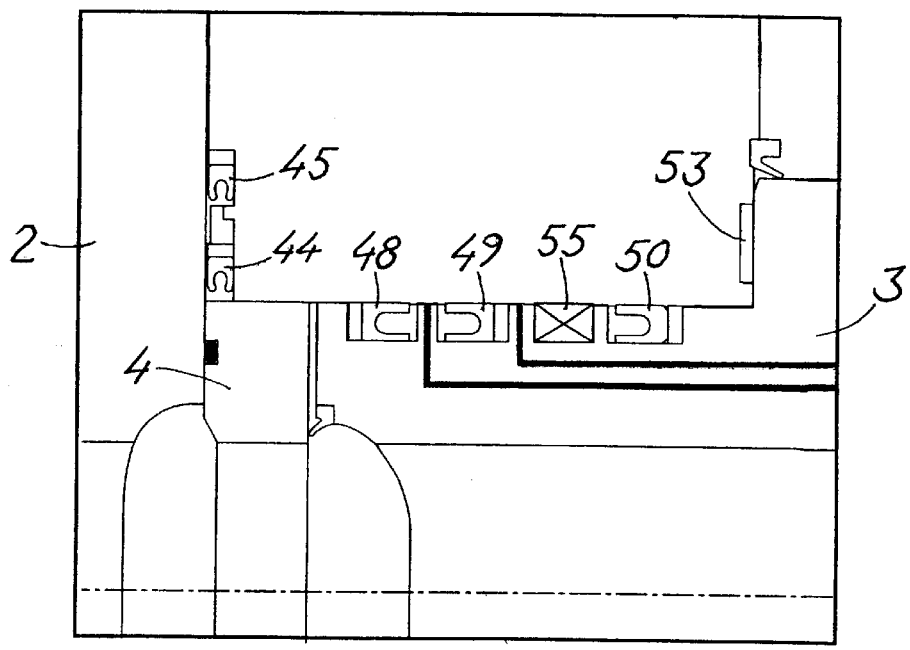

In a manner corresponding to that of the sealing system, there may be used alternative bearing solutions for the above-mentioned axial and radial bearings 17 and 20, respectively. Thus, FIGS. 5 and 6 show alternative solutions with sliding bearings and roller bearings (antifriction bearings). These figures simultaneously show a sealing arrangement in which the dynamic seals 38, 39, 40 correspond to the embodiment according to FIG. 3, whereas the static seals 44, 45 correspond to the embodiment according to FIG. 4.

More specifically, FIG. 5 shows an embodiment having a radial sliding bearing 53 and an axial roller bearing 54, wherein the roller bearing is placed outside of the environment seal 50. Lubrication of the roller bearing takes place from the outside through a non-illustrated lubricant nipple.

Like FIG. 5, FIG. 6 shows a combination having a sliding bearing 53 and a roller bearing 55. However, in this embodiment the roller bearing 55 is placed between seals 49 and 50 which are barrier oil activated. In this manner external lubrication of the bearing is avoided.

As an alternative to FIGS. 5 and 6, there may be used a pure sliding bearing solution, as suggested in the embodiment in FIGS. 3 and 4. This is the simplest and most cost-optimal solution, but the rotational resistance increases.

What is claimed is:

1. A swivel apparatus for the transfer of at least one pressurized process fluid, comprising a central stem (2) on which there are arranged a number of ring elements (3–6) comprising at least two outlet rings (3) of which each has a number of outlets (10) communicating through an associated annulus (14) with an associated course (12 resp. 13) in the stem (2), and a number of supporting rings (5, 6) of which at least one is stationarily arranged on the stem (2), dynamic sealing means (21) for sealing against the annulus (14) being arranged between mutually movable ring elements (3, 5, resp. 3, 6), and bearing means (17) for mutual support of the ring elements, characterized in that, between the stem (2) and each outlet ring (3), there is arranged a distance ring (4) which is stationary relative to the stem, and that, on each side of each outlet ring (3), there is arranged a supporting ring (5 resp. 6) which is stationary relative to the stem (2) and so that each of the outlet rings (3) has its separate set of supporting rings (5, 6), wherein each of the supporting rings is supported both by the respective distance ring (4) and an axial bearing (17) arranged at a radial distance therefrom between the supporting ring (5 resp. 6) and the outlet ring (3) in question, a dynamic sealing means (21) between the individual outlet ring (3) and each adjacent supporting ring (5 resp. 6) being arranged in the region between the distance ring (4) and the axial bearing (17) in question.

2. A swivel apparatus according to claim 1, characterized in that the distance ring (4) comprises a plurality of radial holes (15) communicating with an annulus-forming peripheral groove (14) in the stem (2), and with a ring groove (16) in the adjacent end surface of the outlet ring (3).

3. A swivel apparatus according to claim 1, characterized in that the outlet ring (3) at its outer end is provided with a pair of axially oppositely directed ring flanges (18, 19) bordering respective ones of the supporting rings (5, 6), a radial bearing (20) being arranged between an inner surface of each ring flange (18 resp. 19) and an adjacent surface portion of the supporting rings (5 resp. 6) in question.

4. A swivel apparatus according to claim 1, characterized in that it comprises two assemblies (30, 31) of which each consists of at least one outlet ring (3) with an associated distance ring (4) and supporting rings (5, 6), and which are arranged on either side of a radially projecting holding flange (9) arranged on the stem (2), a locking nut (7 resp. 32) being arranged at each end of the stem (2), for maintaining the ring elements (3–6) in the assembly in question preloaded against said holding flange (9).

5. A swivel apparatus according to claim 1, characterized in that a static sealing means (24) is arranged between the stem (2) and the adjacent inner surface of each supporting ring (5 resp. 6).

6. A swivel apparatus according to claim 5, characterized in that at least some of the sealing means (21, 24) are arranged to be activated by the process fluid.

7. A swivel apparatus according to claim 6, characterized in that each of the dynamic sealing means (21) consists of at least one primary and one secondary seal (38 resp. 39; 48 resp. 49) which are placed side by side between the distance ring (4) and the axial bearing (17).

8. A swivel apparatus according to claim 5, characterized in that at least some of the sealing means (21, 24) are arranged to be activated by means of a barrier liquid having a higher pressure than the process fluid.

9. A swivel apparatus according to claim 8, characterized in that the axial bearing (55) is placed between a radially inner and a radially outer seal (49 resp. 50), the bearing (55) being a roller bearing which is arranged to be lubricated by a barrier liquid in the form of oil.

10. A swivel apparatus according to claim 8, characterized in that the axial bearing is a roller bearing (54; 55) and the radial bearing is a sliding bearing (53).

* * * * *